US007337041B2

(12) United States Patent
Junk et al.

(10) Patent No.: US 7,337,041 B2
(45) Date of Patent: Feb. 26, 2008

(54) FEEDBACK CONTROL METHODS AND APPARATUS FOR ELECTRO-PNEUMATIC CONTROL SYSTEMS

(75) Inventors: Kenneth William Junk, Marshalltown, IA (US); Christopher S. Metschke, Nevada, IA (US)

(73) Assignee: Fisher Controls International, St. Louis, MO (US)

( * ) Notice: Subject to any disclaimer, the term of this patent is extended or adjusted under 35 U.S.C. 154(b) by 239 days.

(21) Appl. No.: 10/867,189

(22) Filed: Jun. 14, 2004

(65) Prior Publication Data

US 2005/0278074 A1 Dec. 15, 2005

(51) Int. Cl.

| | |
|---|---|
| ***G05D 3/00*** | (2006.01) |
| ***G05D 5/00*** | (2006.01) |
| ***G05D 9/00*** | (2006.01) |
| ***G05D 11/00*** | (2006.01) |
| *G05D 3/12* | (2006.01) |

(52) U.S. Cl. ........................ 700/275; 60/413; 702/188; 137/85; 700/285; 700/286; 700/287; 700/289

(58) Field of Classification Search ................ 700/275, 700/282; 60/413; 702/188; 137/85
See application file for complete search history.

(56) References Cited

U.S. PATENT DOCUMENTS

| | | | | |
|---|---|---|---|---|
| 3,747,992 | A * | 7/1973 | Schnipke | 303/40 |
| 4,436,245 | A * | 3/1984 | Nonnenmann et al. | 236/49.4 |
| 4,509,457 | A * | 4/1985 | Durbye | 119/173 |
| 4,550,953 | A * | 11/1985 | Bartholomew | 303/15 |
| 4,598,626 | A | 7/1986 | Walters et al. | |
| 4,644,848 | A * | 2/1987 | McKendrick | 91/419 |
| 5,493,488 | A * | 2/1996 | Castle et al. | 700/42 |
| 5,699,824 | A * | 12/1997 | Kemmler et al. | 137/85 |
| 5,752,489 | A * | 5/1998 | Henderson et al. | 123/494 |
| 6,067,946 | A * | 5/2000 | Bunker et al. | 123/90.12 |
| 6,295,511 | B1 * | 9/2001 | Kemmler | 702/188 |
| 6,311,487 | B1 * | 11/2001 | Ferch | 60/413 |
| 2003/0177569 | A1 * | 9/2003 | Anderson et al. | 4/431 |

FOREIGN PATENT DOCUMENTS

| | | |
|---|---|---|
| EP | 0171998 A | 2/1986 |
| EP | 0824196 A | 2/1998 |
| EP | 1138994 A | 10/2001 |

OTHER PUBLICATIONS

Anthierens C.; Ciftci, A.; and Betemps, M. (1999) Design of an Electro Pneumatic Micro Robot for In-Pipe Inspection, IEEE.*
International Search Report corresponding to International Application No. PCT/US2005/020000, Sep. 13, 2005, 4 pages.
Written Opinion of the International Searching Authority corresponding to International Application No. PCT/US2005/020000, Sep. 13, 2005, 5 pages.

* cited by examiner

*Primary Examiner*—Anthony Knight
*Assistant Examiner*—Sunray Chang
(74) *Attorney, Agent, or Firm*—Hanley, Flight & Zimmerman, LLC

(57) ABSTRACT

Methods and apparatus related to feedback control for electro-pneumatic control systems are disclosed. An example electro-pneumatic control system comprises an electro-pneumatic controller and a secondary pneumatic power stage coupled to the electro-pneumatic controller to provide a feedback signal to the electro-pneumatic controller.

45 Claims, 5 Drawing Sheets

FEEDBACK CONTROL METHODS AND APPARATUS FOR ELECTRO-PNEUMATIC CONTROL SYSTEMS

FIELD OF THE DISCLOSURE

This disclosure relates generally to electro-pneumatic control systems and, more particularly, to feedback control methods and apparatus for electro-pneumatic control systems.

BACKGROUND

Process control plants or systems typically include numerous valves, pumps, dampers, boilers, as well as many other types of well-known process control devices or operators. In modern process control systems most, if not all, of the process control devices or operators are instrumented with electronic monitoring devices (e.g., temperature sensors, pressure sensors, position sensors, etc.) and electronic control devices (e.g., programmable controllers, analog control circuits, etc.) to coordinate the activities of the process control devices or operators to carry out one or more process control routines.

For purposes of safety, cost efficiency and reliability, many process control devices are pneumatically-actuated using well-known diaphragm-type or piston-type pneumatic actuators. Typically, pneumatic actuators are coupled to process control devices either directly or via one or more mechanical linkages. Additionally, the pneumatic actuators are typically coupled to the overall process control system via an electro-pneumatic controller. Electro-pneumatic controllers are usually configured to receive one or more control signals (e.g., 4-20 milliamps (mA), 0-10 volts direct current (VDC), digital commands, etc.) and to convert these control signals into a pressure provided to the pneumatic actuator to cause a desired operation of the process control device. For example, if a process control routine requires a pneumatically-actuated, normally closed stroke-type valve to pass a greater volume of a process fluid, the magnitude of the control signal applied to an electro-pneumatic controller associated with the valve may be increased (e.g., from 10 mA to 15 mA in the case where the electro-pneumatic controller is configured to receive a 4-20 mA control signal). In turn, the output pressure provided by the electro-pneumatic controller to the pneumatic actuator coupled to the valve at least partially increases to stroke the valve toward a full open condition.

In addition to a control signal for indicating a desired set-point of the pneumatically-actuated device (as described in the previous example), the electro-pneumatic controller may be configured to receive a feedback signal from the pneumatically-actuated device. This feedback signal is typically related to an operational response of the pneumatically-actuated device. For example, in the case of a pneumatically-actuated valve, the feedback signal may correspond to the position of the valve as measured by a position sensor. In another example, the position of the pneumatic actuator coupled to the valve may be measured to derive the feedback signal. The feedback signal is typically compared to the set-point, or reference signal, to drive a feedback control loop in the electro-pneumatic controller to determine a pressure to provide to the pneumatic actuator to achieve a desired operation. Feedback control is usually preferred over set-point control alone (also known as open-loop control) because the feedback signal allows the electro-pneumatic controller to automatically counteract or compensate for variations in the controlled process.

The electro-pneumatic controllers used with many modern pneumatically-actuated process control devices are often implemented using relatively complex digital control circuits. For instance, these digital control circuits may be implemented using a microcontroller, or any other type of processor, that executes machine readable instructions, code, firmware, software, etc. to control the operation of the process control device with which it is associated.

To decrease the response time of the process control device, one or more secondary pneumatic power stages may be coupled between the electro-pneumatic controller and the pneumatic actuator. For instance, a secondary pneumatic power stage may include a volume booster and/or a quick exhaust valve. A volume booster increases the amount of or rate at which air is supplied to or exhausted from the pneumatic actuator, which enables the actuator to actuate (e.g., stroke) more quickly the process control device to which it is coupled. Thus, a volume booster may increase the speed at which the actuator is able to stroke a valve to enable the valve to respond more quickly to process fluctuations.

A quick exhaust valve may be coupled between the electro-pneumatic controller and the pneumatic actuator to increase the rate at which air is released or exhausted from a pressurized actuator. Typically, a quick exhaust valve vents air to atmosphere. By increasing the rate at which air is released, the quick exhaust valve enables the actuator to quickly reduce the force applied to the process control device. Thus, a quick exhaust valve may be used to increase the speed at which the actuator can stroke the valve toward a closed or open position.

While secondary pneumatic power stages prove beneficial in decreasing the response time of a pneumatically-actuated device, they may also introduce undesirable transient characteristics in the response of the device. For example, a volume booster may cause a valve to overshoot, in the direction of valve travel, past a desired, steady-state control position. To compensate for such overshoot, the volume booster may then cause the valve to undershoot past the steady-state control position in the opposite direction. In another example, a quick exhaust valve may cause undesirable transient behavior due to its high-capacity, on-off operational response. Moreover, the trip-point for the quick exhaust valve may be highly sensitive and difficult to control, even in the presence of bypasses inserted around the quick exhaust valve. Undesirable transients/control conditions, such as those described above, are typically caused by the delay in the response of the pneumatically-actuated device to variations in the control signal applied the device input, a delay which may be exacerbated by the nonlinear operational characteristics of many secondary pneumatic power stages.

SUMMARY

In one example embodiment, an electro-pneumatic control system includes an electro-pneumatic controller and a secondary pneumatic power stage coupled to the electro-pneumatic controller. The secondary pneumatic power stage may be configured to provide a feedback signal to the electro-pneumatic controller.

In another example embodiment, an electro-pneumatic controller includes an electro-pneumatic transducer, a control unit coupled to the electro-pneumatic transducer and an input to the control unit. Additionally, the input to the control unit may be configured to be coupled to a secondary pneumatic power stage.

In still another example, a method of controlling a pneumatically-actuated device in an electro-pneumatic control system includes detecting an operational response associated with a secondary pneumatic power stage and controlling an operation of the pneumatically-actuated device based on the operational response associated with the secondary pneumatic power stage.

DETAILED DESCRIPTION

As is known, one or more secondary pneumatic power stages (e.g., volume boosters, quick exhaust valves, etc.) may be used to decrease the response time of pneumatically-actuated devices. However, secondary pneumatic power stages may also cause undesirable transients in the operational response of the pneumatically-actuated device. Feedback control, in which a measured operational response of the pneumatically-actuated device is provided as an input to the electro-pneumatic controller, is not sufficient to counteract or compensate for these transients due to the inherent delay of the pneumatically-actuated device in responding to changes at its input. The example methods and apparatus described herein are directed at addressing these limitations.

Figure 1:
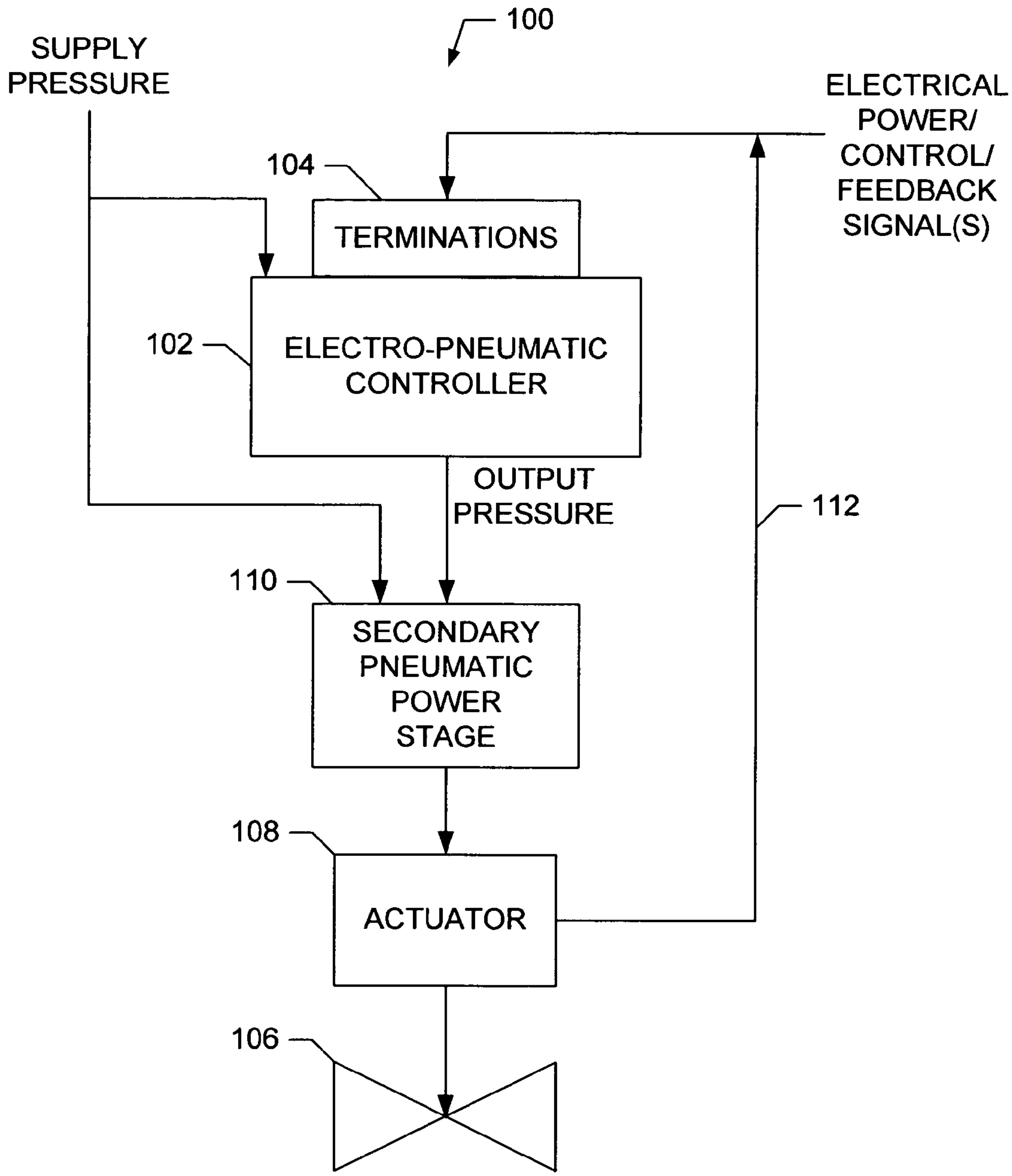
FIG. 1 (PRIOR ART)
FIG. 1 is a block diagram of a known electro-pneumatic control system.

Turning to FIG. 1, a block diagram of a known example electro-pneumatic control system 100 is shown. The electro-pneumatic control system 100 may be part of a process control system (not shown) that implements an industrial processing application, a commercial application, or any other desired application. For example, the system 100 may be part of an industrial process control system that processes oil, gas, chemicals or the like. As shown in FIG. 1, the system 100 includes an electro-pneumatic controller 102 that receives electrical power and control signals via connections or terminations 104. In general, the electro-pneumatic controller 102 receives one or more control signals such as, for example, a 4-20 mA signal, a 0-10VDC signal, and/or digital commands, etc. The control signals may be used by the electro-pneumatic controller 102 as a set-point to control its output pressure and/or the operational condition (e.g., the position) of a process control device 106 (which is depicted by way of example to be a valve).

In some examples, electrical power and control signals may share one or more lines or wires coupled to the terminations 104. For instance, in the case where the control signal is a 4-20 mA signal, the 4-20 mA control signal may also provide electrical power to the electro-pneumatic controller 102. In other examples, the control signal may, for example, be a 0-10 VDC signal and separate electrical power wires or lines (e.g., 24 VDC or 120 volts alternating current (VAC)) may be provided to the electro-pneumatic controller 102. In still other cases, the electrical power and/or control signals may share wires or line with digital data signals. For example, in the case where the control signal is a 4-20 mA signal, a digital data communication protocol such as, for example, the well-known Highway Addressable Remote Transducer (HART) protocol may be used to communicate with the electro-pneumatic controller 102. Such digital communications may be used by the overall process control system to which the system 100 is coupled to retrieve identification information, operation status information and the like from the electro-pneumatic controller 102. Alternatively or additionally, the digital communications may be used to control or command the electro-pneumatic controller 102 to perform one or more control functions.

The terminations 104 may be screw terminals, insulation displacement connectors, pigtail connections, or any other type or combination of suitable electrical connections. Of course, the terminations 104 may be replaced or supplemented with one or more wireless communication links. For example, the electro-pneumatic controller 102 may include one or more wireless transceiver units (not shown) to enable the electro-pneumatic controller 102 to exchange control information (set-point(s), operational status information, etc.) with the overall process control system. In the case where one or more wireless transceivers are used by the electro-pneumatic controller 102, electrical power may be supplied to the electro-pneumatic controller 102 via, for example, wires to a local or remote electrical power supply.

As is depicted in the example system 100 of FIG. 1, the output pressure of the electro-pneumatic controller 102 is coupled to a pneumatic actuator 108 through a secondary pneumatic power stage 110. The actuator 108 is also coupled to the process control operator or device 106. Although the process control operator or device 106 is depicted as a valve, other devices or operators could be used instead (e.g., a damper). The pneumatic actuator 108 may be directly coupled to the device 106 or, alternatively, may be coupled to the device 106 via linkages or the like. For example, in the case where the process control device 106 is a stroke type valve, an output shaft of the pneumatic actuator 108 may be directly coupled to a control shaft of the device 106.

The secondary pneumatic power stage 110 may include, for example, one or more volume boosters and/or quick exhaust valves. In the example system 100 of FIG. 1, a volume booster may be coupled to the output of the electro-pneumatic controller 102 to amplify (i.e., increase the capacity and/or pressure of) the pressure output from the electro-pneumatic controller 102 before applying it to the input of the pneumatic actuator 108. Alternatively or additionally, a quick exhaust valve may be coupled between the outputs of the electro-pneumatic controller 102 and/or one or more volume boosters and the input to the pneumatic actuator 108. This arrangement allows the quick exhaust valve to dump the pressure within the pneumatic actuator 108 to atmosphere. One having ordinary skill in the art will recognize that many configurations of secondary pneumatic power stages, each having one or more volume boosters, quick exhaust valves and the like, are possible, with the preferred configuration depending on the process being controlled.

Under normal operating conditions, a position detector or sensor (not shown) may be used to provide a position feedback signal 112 to the electro-pneumatic controller 102. If provided, the position feedback signal 112 may be used by the electro-pneumatic controller 102 to vary its output pressure to precisely control the position of the process control operator or device 106 (e.g., the percentage a valve is open/closed). The position sensor may be implemented using any suitable sensor such as, for example, a hall-effect sensor, a linear voltage displacement transformer, a potentiometer, etc.

Those of ordinary skill in the art will also recognize that while the electro-pneumatic controller 102 shown in FIG. 1 is depicted as having a single output pressure for use with a single-acting type actuator (e.g., the actuator 108), a pneumatic controller having two pressure outputs for use in a dual-acting application could be used as well. For example, one commercially available dual acting electro-pneumatic controller is the DVC6000 series digital valve controller manufactured by Fisher Controls International, Inc. of Marshalltown, Iowa.

Figure 2:
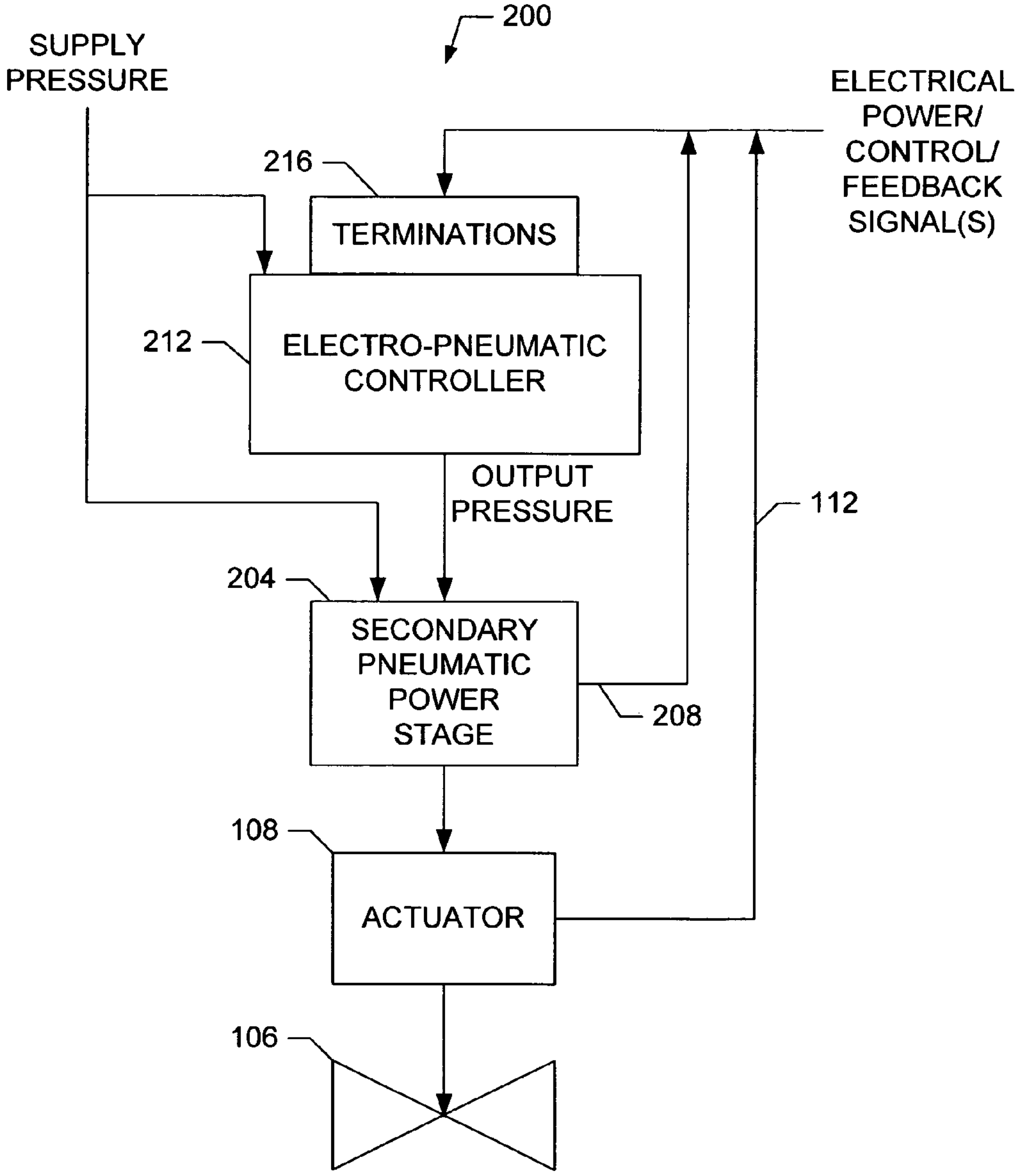
FIG. 2 is a block diagram of an example electro-pneumatic control system that includes a feedback signal from a secondary pneumatic power stage.

To address some of the limitations associated with the example known system 100 of FIG. 1, an example electro-pneumatic control system 200 for implementing the methods and apparatus described herein is illustrated in FIG. 2. In FIGS. 1 and 2, substantially similar blocks appearing in both figures are labeled with identical reference numerals and, in the interest of brevity, will not be re-described below. Instead, a complete description of the corresponding blocks may be found above in connection with the description of FIG. 1.

The electro-pneumatic control system 200 of FIG.2 includes a secondary pneumatic power stage 204 suitably modified to output one or more feedback signals 208 representative of one or more operational responses of the secondary pneumatic power stage 204. For example, an operational response of interest may be associated with an air mass flow at the output of the secondary pneumatic power stage 204. The air mass flow may be measured at the output of the secondary pneumatic power stage 204 and used as the feedback signal or signals 208. For example, an orifice plate with known differential pressure to mass flow properties may be inserted into the output path of the secondary pneumatic power stage 204 and/or one or more of the components therein. Based on its known properties, a differential pressure may be measured across the orifice plate and converted into a corresponding air mass flow measurement. In this way, the air mass flow at the output of the secondary pneumatic power stage 204 and/or one or more of the components therein may be determined and provided as the one or more feedback signals 208 to the electro-pneumatic controller 212.

However, in some applications it may be difficult or impractical to measure the air mass flow directly and, thus, other operational responses bearing a relationship to the air mass flow may be measured instead. For example, in the case where the secondary pneumatic power stage 204 includes a volume booster, the feedback signal 208 may correspond to a measured position of a poppet valve that controls the output of the volume booster. In such a configuration, the poppet valve position is related to the curtain area of the poppet valve which, under many conditions, is proportional to the air mass flow at the output of the volume booster. A sensor, such as a hall-effect sensor, may be used to measure the poppet valve position, and may be external to the secondary pneumatic power stage 204 or integrated into the secondary pneumatic power stage 204. In another example in which the actuator 108 is a single-acting actuator and the secondary pneumatic power stage 204 includes a quick exhaust valve and/or one or more volume boosters, the feedback signal 208 may correspond to a derivative of a pressure measured at the output of the secondary pneumatic power stage 204. In the case in which the actuator 108 is a double-acting actuator, the feedback signals 208 may correspond to a derivative of a differential pressure measured using at least two outputs of the secondary pneumatic power stage 204 corresponding to at least two inputs of the double-acting actuator 108. In either case, the pressure measurements may be taken, for example, at the output(s) of the secondary pneumatic power stage 204, downstream of the secondary pneumatic power stage 204, and/or at the input(s) to the actuator 108. Pressure taps may be used, for example, to measure the pressure, and may be external to the secondary pneumatic power stage 204 or integrated into the secondary pneumatic power stage 204. The derivative of the measured pressure (or differential pressure) may be determined by the electro-pneumatic controller 212 based on the feedback signal or signals 208.

The feedback signal 208 is coupled to a suitably-modified electro-pneumatic controller 212 via connections or terminations 216. In the example system 200, the electro-pneumatic controller 212 is configured to receive multiple feedback signals from various sources (e.g., the pneumatic actuator 108 and the secondary pneumatic power stage 204). The electro-pneumatic controller 212 may also be configured to vary its output pressure based on these multiple feedback signals and additional control or reference signals to precisely control the position of the process control operator or device 106.

Figure 3:
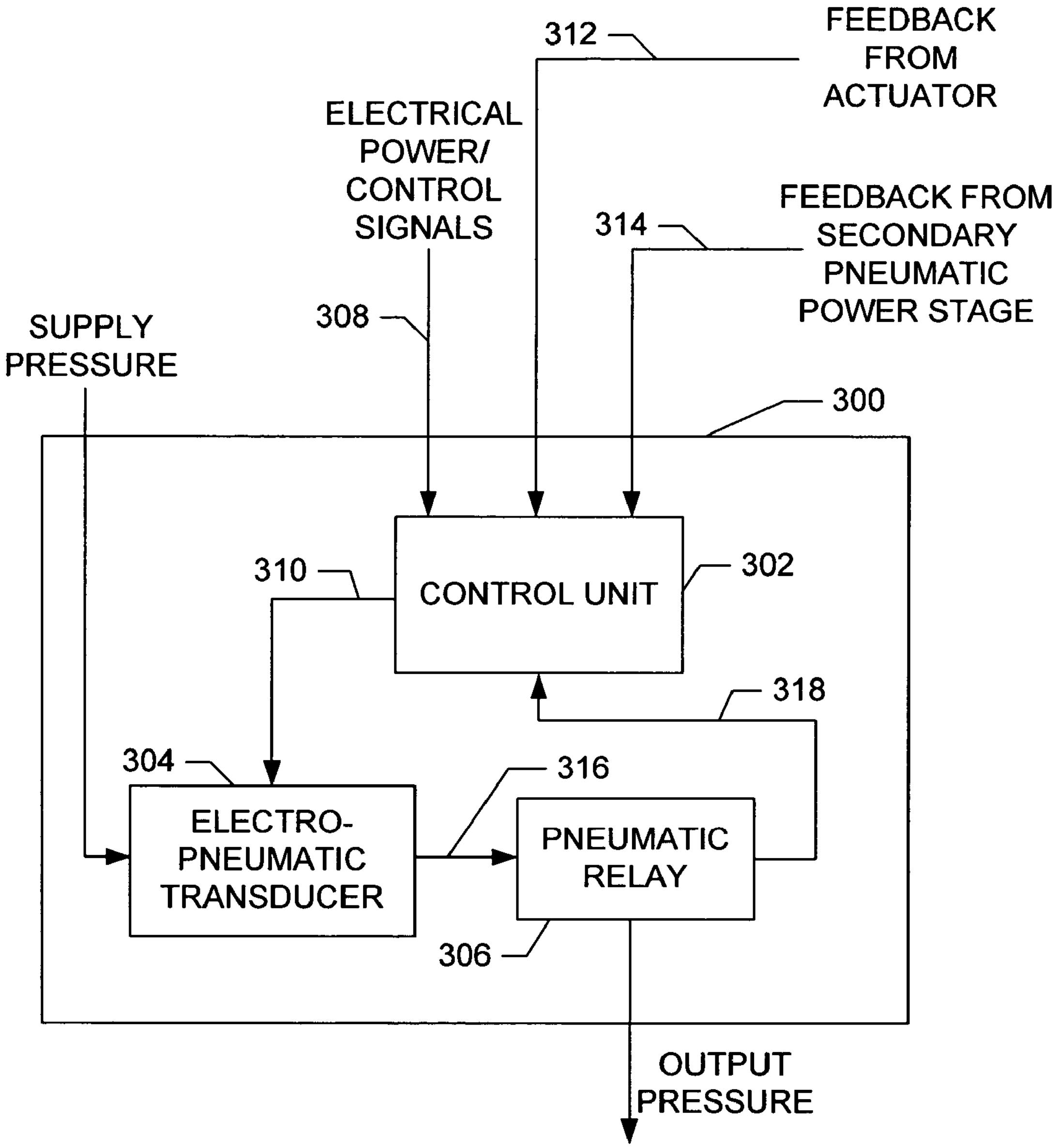
FIG. 3 is a detailed block diagram of an example electro-pneumatic controller that may be used with the system of FIG. 2.

FIG. 3 is a detailed block diagram of an example of an electro-pneumatic controller 300 that may be used with the system 200 of FIG. 2 (e.g., as the electro-pneumatic controller 212). The example electro-pneumatic controller 300 includes a control unit 302, an electro-pneumatic transducer 304 and a pneumatic relay 306.

The control unit 302 receives one or more control signals 308 (e.g., a 4-20 mA control signal) from the overall process control system to which it is communicatively coupled and provides a control signal 310 to the electro-pneumatic transducer 304 to achieve a desired output pressure and/or a desired control position of the process control device (e.g., the device 106 of FIG. 2) to which it is operatively coupled. The control unit 302 may be implemented using a processor-based system (e.g., the system 500 described below in connection with FIG. 5), discrete digital logic circuits, application specific integrated circuits, analog circuitry, or any combination thereof. In a case where a processor-based system is used to implement the control unit 302, the control unit 302 may execute machine readable instructions, firmware, software, etc. stored on a memory (not shown) within the control unit 302 to perform its control functions.

The control unit 302 is also configured to receive feedback signals from one or more devices in the process control system. The example control unit 302 is configured to receive a feedback signal 312 from an actuator (such as the actuator 108 of FIG. 2) and a feedback signal or signals 314 from a secondary pneumatic power stage (such as the secondary pneumatic power stage 204 of FIG. 2). The control unit 302 uses the control signals 308 and the feedback signals 312 and 314 (as well as the feedback signal 318 discussed below) to determine an appropriate value of the control signal 310, which is provided to the electro-pneumatic transducer 304.

The electro-pneumatic transducer 304 and the pneumatic relay 306 are generally well-known structures. The electro-pneumatic transducer 304 may be a current-to-pressure type of transducer, in which case the control signal 310 is a current that is varied by the control unit 302 to achieve a desired condition (e.g., a position) at the process control device 106. Alternatively, the electro-pneumatic transducer 304 may be a voltage-to-pressure type of transducer, in which case the control signal 310 is a voltage that varies to control the process control device 106. The pneumatic relay 306 converts a relatively low capacity (i.e., low flow rate) pressure output 316 into a relatively high capacity output for controlling an actuator. As depicted in FIG. 3, the control unit 302 may be configured to receive an output pressure feedback signal 318 from the pneumatic relay 306. However, in some applications it may be difficult or impractical to measure the output pressure (or air mass flow) from the pneumatic relay 306 directly and, thus, the feedback signal 318 may correspond to a measurement of another, related operational response. For example, the feedback signal 318 may correspond to a relay position of the pneumatic relay 306 as measured by a giant magneto-resistive (GMR) sensor and processed by an analog-to-digital (A/D) converter. The feedback signal 318 may be used as a diagnostic signal and/or converted to, for example, a derivative of pressure (or air mass flow) to provide more accurate closed-loop control over the output of the electro-pneumatic controller 300.

Figure 4:
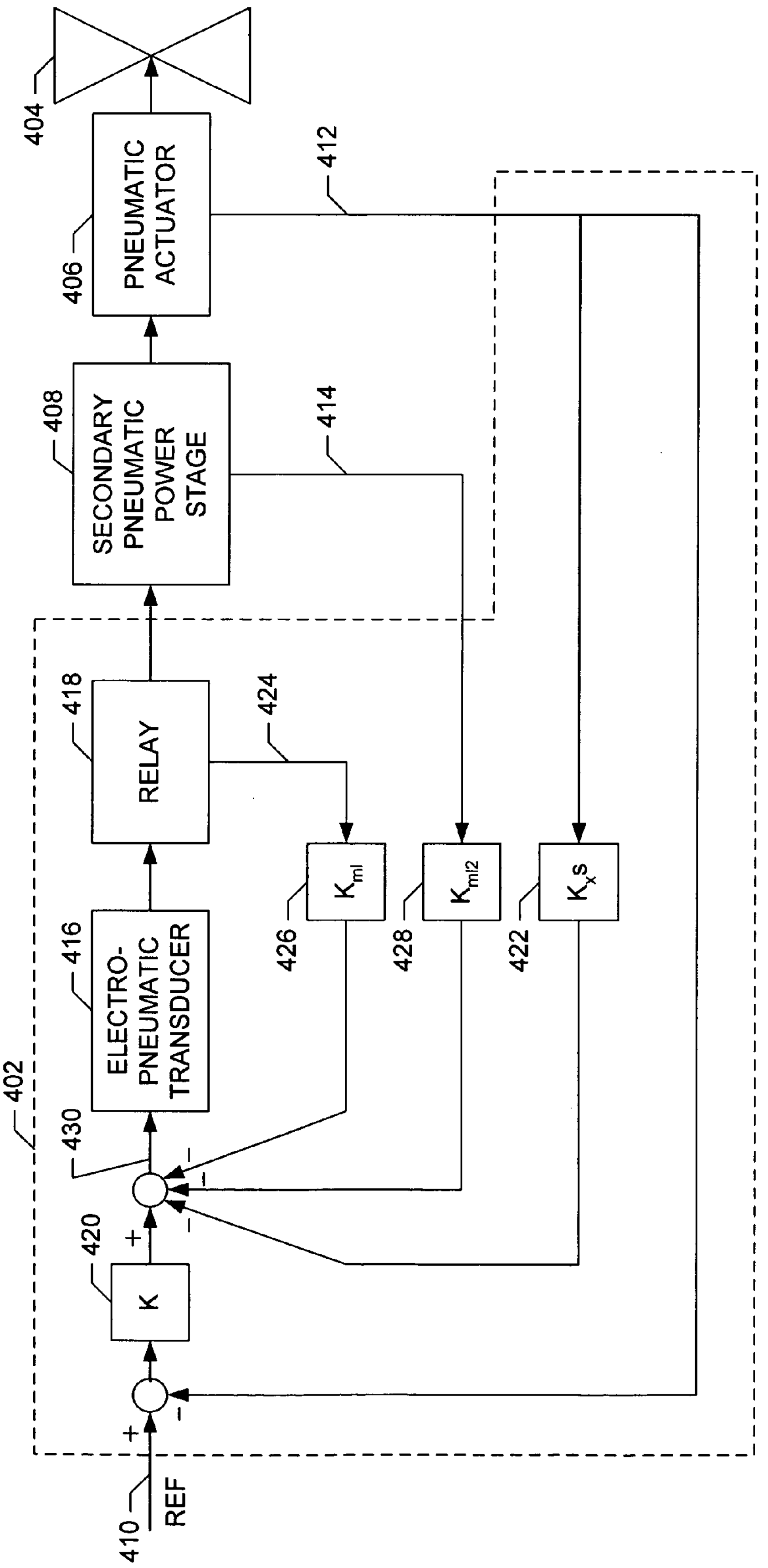
FIG. 4 is a detailed, functional block diagram of the example electro-pneumatic control system of FIG. 2.

To better understand the operation of the electro-pneumatic controller 300 of FIG. 3 in the context of the example electro-pneumatic control system 200 of FIG. 2, a detailed functional block diagram of an example feedback control system 400 that may be implemented by an electro-pneumatic controller 402 is shown in FIG. 4. Similar to the example system 200 of FIG. 2, the electro-pneumatic control system 400 includes a process control device 404 (e.g., a valve) coupled to a pneumatic actuator 406. The electro-pneumatic controller 402 is coupled to the pneumatic actuator 406 through a secondary pneumatic power stage 408. Similar to the secondary pneumatic power stage 204 of FIG. 2, the secondary pneumatic power stage 408 may include one or more volume boosters, quick exhaust valves, or the like.

A reference control signal 410 (such as the control signal(s) 308 of FIG. 3) is applied to the input of the electro-pneumatic controller 402 to indicate a desired set-point for the process control device 404. The electro-pneumatic controller 402 is also configured to receive feedback signal 412 (such as the feedback signal 312) and feedback signal 414 (such as the feedback signal 314) from the pneumatic actuator 406 and the secondary pneumatic power stage 408, respectively. Similar to the example electro-pneumatic controller 300 of FIG. 3, the electro-pneumatic controller 402 includes an electro-pneumatic transducer 416 (such as the electro-pneumatic transducer 304) to convert an input electrical control signal to a pressure signal. The controller 402 also includes a relay 418 (such as the pneumatic relay 306) to convert the relatively low capacity output pressure from the transducer 416 to a relatively high capacity output pressure.

A control unit (such as the control unit 302 of FIG. 3, but not shown in FIG. 4) in the electro-pneumatic controller 402 is configured to implement the example feedback control system of FIG. 4 as described below. The reference control input 410 and the actuator feedback signal 412 are subtracted to produce an error signal that is applied to a forward path proportional gain element 420 (K). The actuator feedback signal 412 is also applied to a feedback derivative gain element 422 ($K_x s$). Thus, proportional-derivative (PD) negative feedback control is derived from the actuator feedback signal 412.

Additionally, a feedback signal 424 (such as the feedback signal 318 of FIG. 3) from the relay 418 is applied to a minor loop proportional gain element 426 ($K_{ml}$). The secondary pneumatic power stage feedback signal 414 is applied to another minor loop proportional gain element 428 ($K_{ml2}$). Finally, the outputs of the gain elements 422, 426 and 428 are subtracted from the output of gain element 420 to produce an input control signal 430 (such as the control signal 310) that is applied to the electro-pneumatic transducer 416. One having ordinary skill in the art will appreciate that any or all of the feedback gain elements 420, 422, 424 and 426 may convert its input signal (e.g., a pressure signal) to the appropriate type of output signal (e.g., an electrical signal). Thus, the mathematical units associated with the feedback gain elements 420, 422, 424 and 426 depend on the characteristics of the devices providing the inputs to the gain elements and receiving the outputs from the gain elements.

As mentioned previously, process control devices (e.g., the process control device 404) and their corresponding actuators (e.g., the actuator 406) may have a relatively slow response time. As a result, the feedback control derived from the actuator feedback signal 412 through the proportional and derivative gain elements 420 and 422, respectively, may not be sufficient to counteract or compensate for the transient variations that may be introduced by the secondary pneumatic power stage 408. However, the example electro-pneumatic controller 402 may compensate for these transients via the negative feedback control derived from the secondary pneumatic power stage feedback signal 414 through the minor loop proportional gain element 428. Furthermore, if the secondary pneumatic power stage feedback signal 414 represents, for example, an air mass flow associated with the secondary pneumatic power stage 408, then the electro-pneumatic controller 402 may use this information to respond more quickly to changes in the state of the process control device 404 than would be possible if a signal representative of the state of the device 404 (or associated actuator 406) were the only feedback signal. Thus, the electro-pneumatic controller 402 is able to achieve an overall system response with desirable characteristics, such as, a response having a desired rate of convergence and within a desired range of overshoot/undershoot.

One having ordinary skill in the art will appreciate that the example of FIG. 4 is just one example of a feedback control system that may be implemented by an electro-pneumatic controller such as the example electro-pneumatic controller 402. For example, the electro-pneumatic controller 402 could be configured to accept feedback from only the secondary pneumatic power stage 408, more than one feedback signal from the secondary pneumatic power stage 408 and/or feedback signals from more than one secondary pneumatic power stage 408. Also, the electro-pneumatic controller 402 may be configured to implement other arrangements of feedback control. For example, the electro-pneumatic controller 402 may be configured to implement proportional control, derivative control, integral control or combinations thereof based on one or more control and/or feedback signals. Of course, the preferred configuration depends on the controlled process.

In many process control applications, the desired system response is critically-damped. A critically-damped system has a step response that reaches a desired set-point within a desired rate of convergence and with a minimal amount of overshoot/undershoot. In the example system 400 of FIG. 4, the gain elements 420, 422, 426, and 428 may be adjusted to achieve a critically-damped response at the pneumatic actuator 406 and/or the process control device 404.

To achieve a desired (e.g., critically-damped) operational response, any or all of the gain elements 420, 422, 426 and 428 may be configured, for example, to be adjustable during an initial calibration of the feedback control system 400.

One having ordinary skill in the art will appreciate that the techniques used to adjust the values of the gain elements 420, 422, 426 and/or 428 depend on the configuration and/or the characteristics of the particular process control application in which the feedback control system 400 is employed.

Returning to FIG. 2, one having ordinary skill in the art will appreciate that the one or more feedback signals 208 from the secondary pneumatic power stage 204 and/or components therein may provide useful diagnostic information to the electro-pneumatic controller 212. For example, in the example known control system 100 of FIG. 1, the feedback signal 112 may also be used to assess the operating condition of the pneumatic actuator 108. However, as shown in the example control system 100 of FIG. 1, a signal providing diagnostic information for the secondary pneumatic power stage 110 is not readily available. In the case of the example control system 200 of FIG. 2, the feedback signal or signals 208 may be used in a manner similar to that of the feedback signal 112 to provide diagnostic information associated with the operating condition of the secondary pneumatic power stage 204 and/or additional diagnostic information corresponding to the pneumatic actuator 108. For example, if one of the feedback signals 208 corresponds to a pressure measured at the output of a volume booster, then the value of the feedback signal 208 may be used to determine if the volume booster is functioning within normal operating specifications. Information of this type may be useful in diagnosing an existing problem with the control system 200 and/or remedying a potential problem before it occurs.

Figure 5:
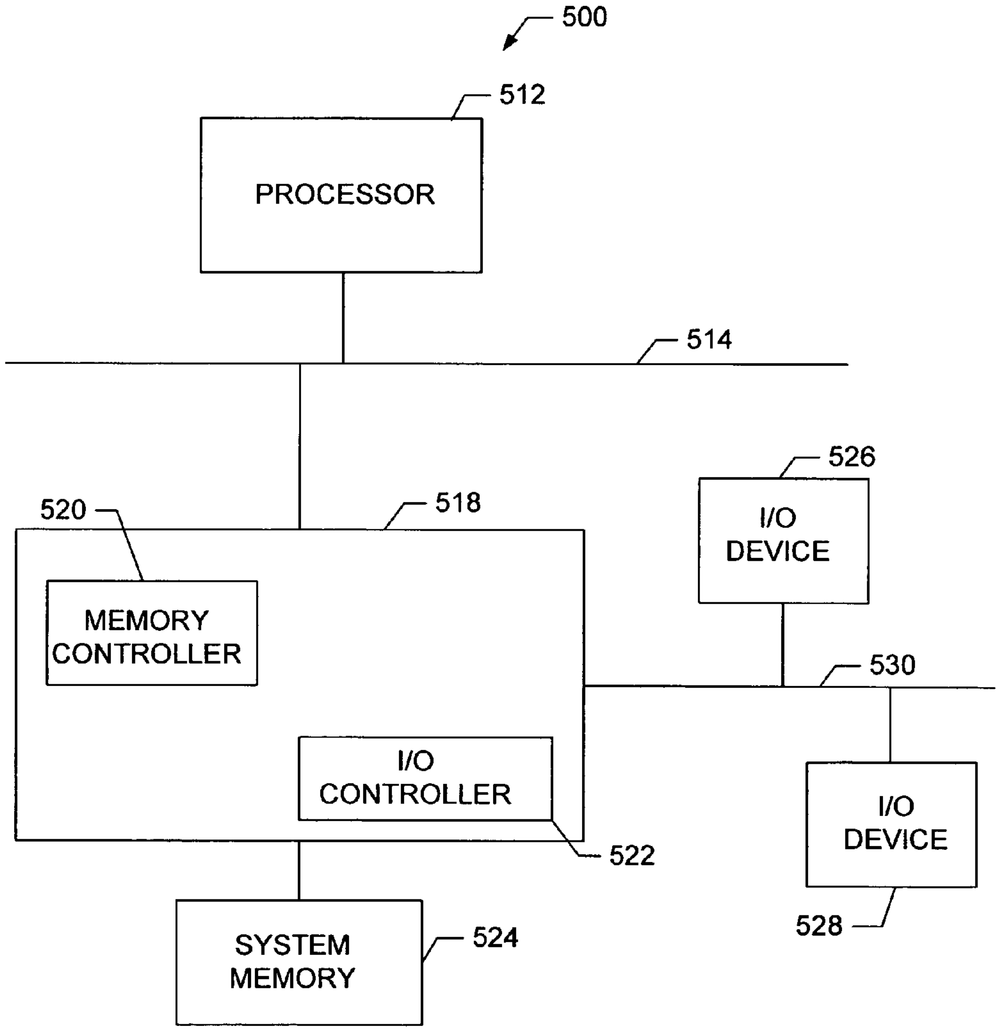
FIG. 5 is an example processor system that may be used to implement the control unit of FIG. 2.

FIG. 5 is an example processor system 500 that may be used to implement the control unit 302 of FIG. 3. As shown in FIG. 5, the processor system 500 includes a processor 512 that is coupled to an interconnection bus or network 514. The processor 512 may be any suitable processor, processing unit, microprocessor or microcontroller such as, for example, a microcontroller in the Motorola® family of microcontrollers (e.g., the HC05, the HC11 or the HC12), a processor based on an ARM® embedded processor core (e.g., the ARM7 or ARM9), etc. Although not shown in FIG. 5, the system 500 may be a multi-processor system and, thus, may include one or more additional processors that are identical or similar to the processor 512 and which are coupled to the interconnection bus or network 514.

The processor 512 of FIG. 5 is coupled to a chipset 518, which includes a memory controller 520 and an input/output (I/O) controller 522. As is well known, a chipset typically provides I/O and memory management functions as well as a plurality of general purpose and/or special purpose registers, timers, etc. that are accessible or used by one or more processors coupled to the chipset. The memory controller 520 performs functions that enable the processor 512 (or processors if there are multiple processors) to access a system memory 524, which may include any desired type of volatile memory such as, for example, static random access memory (SRAM), dynamic random access memory (DRAM), etc. The I/O controller 522 performs functions that enable the processor 512 to communicate with peripheral input/output (I/O) devices 526 and 528 via an I/O bus 530. The I/O devices 526 and 528 may be any desired type of I/O device such as, for example, a liquid crystal display (LCD) screen and a plurality of push buttons included in a local user interface (LUI), etc. While the memory controller 520 and the I/O controller 522 are depicted in FIG. 5 as separate functional blocks within the chipset 518, the functions performed by these blocks may be integrated within a single semiconductor circuit or may be implemented using two or more separate integrated circuits.

As an alternative to implementing the methods and/or apparatus described herein in a system such as the device of FIG. 5, the methods and or apparatus described herein may alternatively be embedded in a structure such as a processor and/or an ASIC (application specific integrated circuit). Alternatively, the methods and or apparatus described herein may be implemented using discrete analog and/or digital logic elements.

Although certain example methods and apparatus have been described herein, the scope of coverage of this patent is not limited thereto. On the contrary, this patent covers all methods and apparatus fairly falling within the scope of the appended claims either literally or under the doctrine of equivalents.

What is claimed is:

1. An electro-pneumatic control system comprising:

an electro-pneumatic controller; and a secondary pneumatic power stage coupled to the electro-pneumatic controller to provide a first feedback signal from the secondary pneumatic power stage to the electro-pneumatic controller, wherein each of the secondary pneumatic power stage and the electro-pneumatic controller is configured to be coupled to a pneumatic actuator, wherein the electro-pneumatic controller is configured to receive a second feedback signal from the pneumatic actuator, and wherein the second feedback signal is separate from the first feedback signal.

2. An electro-pneumatic control system as defined in claim 1 wherein the secondary pneumatic power stage comprises a volume booster.

3. An electro-pneumatic control system as defined in claim 1 wherein the secondary pneumatic power stage comprises a quick exhaust valve.

4. An electro-pneumatic control system as defined in claim 1 wherein the first feedback signal is based on a measurement of a position.

5. An electro-pneumatic control system as defined in claim 4 wherein the position is based on a poppet valve position.

6. An electro-pneumatic control system as defined in claim 5 further comprising a hall-effect sensor to measure the poppet valve position.

7. An electro-pneumatic control system as defined in claim 1 wherein the first feedback signal is based on a pressure associated with an output of the secondary pneumatic power stage.

8. An electro-pneumatic control system as defined in claim 7 wherein the first feedback signal is based on a derivative of the pressure.

9. An electro-pneumatic control system as defined in claim 1 wherein the first feedback signal is based on a first pressure associated with a first output of the secondary pneumatic power stage and a second pressure associated with a second output of the secondary pneumatic power stage.

10. An electro-pneumatic control system as defined in claim 9 wherein the first feedback signal is based on a difference between the first pressure and the second pressure.

11. An electro-pneumatic control system as defined in claim 10 wherein the first feedback signal is based on a derivative of the difference between the first pressure and the second pressure.

12. An electro-pneumatic control system as defined in claim 1 wherein the electro-pneumatic controller is configured to convert the first feedback signal to correspond to an air mass flow associated with an output of the secondary pneumatic power stage.

13. An electro-pneumatic control system as defined in claim 1 wherein the electro-pneumatic controller is configured to implement a feedback loop based on the first feedback signal.

14. An electro-pneumatic control system as defined in claim 13 wherein the feedback loop is a negative feedback loop.

15. An electro-pneumatic control system as defined in claim 13 wherein the electro-pneumatic controller is configured to determine a third feedback signal based on the first feedback signal, and wherein the feedback loop is based on the third feedback signal.

16. An electro-pneumatic control system as defined in claim 15 wherein the third feedback signal is equal to the first feedback signal scaled by a gain factor.

17. An electro-pneumatic control system as defined in claim 16 wherein the gain factor is based on a response characteristic of a pneumatically-actuated device.

18. An electro-pneumatic control system as defined in claim 1 further comprising the pneumatic actuator coupled to the electro-pneumatic controller to provide the second feedback signal to the electro-pneumatic controller.

19. An electro-pneumatic control system as defined in claim 1 wherein the electro-pneumatic controller is configured to implement a feedback loop based on the first and second feedback signals.

20. An electro-pneumatic control system as defined in claim 19 wherein the electro-pneumatic controller is configured to determine at least one of a third feedback signal based on the first feedback signal or a fourth feedback signal based on the second feedback signal, and wherein the feedback loop is based on the at least one of the third feedback signal or the fourth feedback signal.

21. An electro-pneumatic control system as defined in claim 20 wherein the third feedback signal is equal to the first feedback signal scaled by a first gain factor and the fourth feedback signal is equal to the second feedback signal scaled by a second gain factor.

22. An electro-pneumatic control system as defined in claim 1 wherein the electro-pneumatic controller is configured to implement a diagnostic monitor based on the first feedback signal.

23. An electro-pneumatic control system as defined in claim 22 wherein the electro-pneumatic controller is configured to implement a second diagnostic monitor based on the second feedback signal.

24. An electro-pneumatic controller comprising:

an electro-pneumatic transducer;

a control unit coupled to the electro-pneumatic transducer;

a first input to the control unit, wherein the first input is configured to be coupled to a secondary pneumatic power stage; and a second input to the control unit, wherein the second input is configured to be coupled to a pneumatic actuator, and wherein the first and second input signals are separate input signals.

25. An electro-pneumatic controller as defined in claim 24 wherein the control unit is configured to implement a feedback loop based on the first input.

26. An electro-pneumatic controller as defined in claim 24 wherein the second input is indicative of an operational response of a pneumatically-actuated device coupled to the pneumatic actuator.

27. An electro-pneumatic controller as defined in claim 24 wherein the control unit is configured to implement a feedback loop based on the first and second inputs.

28. An electro-pneumatic controller as defined in claim 24 wherein the control unit is configured to implement a diagnostic monitor based on the first input.

29. A method of controlling a pneumatically-actuated device in an electro-pneumatic control system comprising:

detecting via a controller a first operational response of a secondary pneumatic power stage;

detecting via the controller a second operational response of a pneumatic actuator; and controlling an operation of the pneumatically-actuated device based on the first and second operational responses, wherein the first and second responses are separate signals.

30. A method as defined in claim 29 wherein the second operational response is indicative of an operation of the pneumatically-actuated device.

31. A method as defined in claim 29 wherein the secondary pneumatic power stage comprises at least one of a volume booster or a quick exhaust valve.

32. A method as defined in claim 29 wherein detecting the first operational response comprises measuring a pressure associated with an output of the secondary pneumatic power stage.

33. A method as defined in claim 32 wherein detecting the first operational response comprises determining a derivative of the pressure.

34. A method as defined in claim 29 wherein detecting the first operational response comprises measuring a first pressure associated with a first output of the secondary pneumatic power stage and a second pressure associated with a second output of the secondary pneumatic power stage.

35. A method as defined in claim 34 wherein detecting the first operational response comprises determining a difference between the first pressure and the second pressure.

36. A method as defined in claim 35 wherein detecting the first operational response comprises determining a derivative of the difference between the first pressure and the second pressure.

37. A method as defined in claim 29 wherein detecting the first operational response comprises measuring a position.

38. A method as defined in claim 37 wherein measuring the position comprises measuring a poppet valve position.

39. A method as defined in claim 29 wherein controlling the operation of the pneumatically-actuated device comprises converting the first operational response to correspond to an air mass flow associated with an output of the secondary pneumatic power stage.

40. A method as defined in claim 29 wherein controlling the operation of the pneumatically-actuated device comprises implementing a feedback loop based on the first operational response.

41. A method as defined in claim 40 wherein the feedback loop is a negative feedback loop.

42. A method as defined in claim 40 wherein controlling the operation of the pneumatically-actuated device comprises determining a third operational response based on the first operational response, and wherein the feedback loop is based on the third operational response.

43. A method as defined in claim 42 wherein the third operational response is equal to the first operational response scaled by a gain factor.

44. A method as defined in claim 43 wherein the gain factor is based on an operational response associated with the pneumatically-actuated device.

45. A method as defined in claim 29 further comprising determining diagnostic information for at least one of the secondary pneumatic power stage or the pneumatically-actuated device based on the first operational response.

* * * * *